United States Patent Office 3,810,961
Patented May 14, 1974

3,810,961
PROCESS FOR PREPARING TRIS(2-HALOALKYL) PHOSPHITES
Philip M. Pivawer, Hamden, Conn., assignor to Olin Corporation
No Drawing. Filed Aug. 25, 1972, Ser. No. 283,974
Int. Cl. C07f 9/08
U.S. Cl. 260—977                    15 Claims

ABSTRACT OF THE DISCLOSURE

Tris(2-haloalkyl)phosphites are prepared by reacting a phosphorus trihalide with an alkylene oxide in the presence of a tertiary amine hydrohalide, a tetra-alkyl quaternary ammonium halide, or a mixture thereof. These tris (2-haloalkyl)phosphites are useful intermediates in the preparation of flame retardant phosphate esters.

---

This invention relates to an improved process for the preparation of tris(2-haloalkyl)phosphites. More particularly the invention relates to novel catalysts for the reaction of phosphorus trihalide with an alkylene oxide to form tris(2-haloalkyl)phosphites which are represented by Formula I as follows

wherein X is halogen and R is hydrogen or an alkyl radical.

These tris(2-haloalkyl)phosphites are useful as flame retardant additives. In addition, they are of particularly utility as chemical intermediates in the preparation of highly flame retardant halogenated phosphorus esters. For example, a highly effective group of flame retardant additives are the tetrakis(2-haloalkyl)alkylene diphosphates. These can be prepared by reacting an alkylene glycol with bis(2-haloalkyl)phosphorohalidate, the latter in turn being prepared by reacting a tris(2-haloalkyl)phosphite of Formula I above with a halogen.

It is known in the art to prepare tris(2-haloalkyl) phosphites by catalytically reacting a phosphorous trihalide with an alkylene oxide. Because of the highly exothermic nature of the reaction, it must ordinarily be carried out at low, closely controlled temperatures in order to preclude the occurrence of undesirable side effects such as the formation of substantial amounts of undesirable byproducts.

It has also been found, according to the invention, that tris(2-haloalkyl)phosphites which are produced by prior art reactions almost invariably contain phosphonate impurities as reaction byproducts. These phosphonates have been found to have the following molecular structure

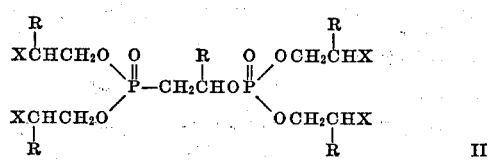

wherein X and R have the significance indicated above. Without intending to be limited to the following theory, it is believed that this phosphonate impurity results from coupling of two phosphite molecules in the course of the reaction of the phosphorus trihalide with the alkylene oxide.

As impurities, these phosphonate byproducts are difficult, if not impossible, to separate from the main tris(2-haloalkyl)phosphite reaction product. Thus they are usually carried over as impurities in subsequent reactions involving the phosphite. The ultimate result is that the phosphonate impurity in the phosphites eventually becomes an impurity in the flame retardant halogenated phosphorus esters which are derived from these phosphites. Such impurities are highly undesirable particularly where the flame retardant material is to be used as an additive in polyurethane foam; for it has been found, according to the invention, that the presence of these phosphonate impurities has a detrimental effect on the physical properties of the foam. For example, these phosphonates have been found to be deterimental to the dry heat aging properties of the foam.

Now it has been discovered that the formation of phosphonate byproducts in the preparation of tris(2-haloalkyl) phosphites can be eliminated. This is achieved, according to the process of the invention, by carrying out the reaction of phosphorus trihalide with an alkylene oxide in the presence of a select group of catalysts, namely, a tertiary amine hydrohalide, a tetra-alkyl quaternary ammonium halide, or a mixture thereof. The use of such catalysts, along with eliminating the formation of phosphonate byproducts, has the added advantage of promoting a smooth and relatively speedy reaction which is substantially free of the drawbacks of the prior art.

More in detail, the reaction to which the present invention pertains may be represented by Equation III as follows

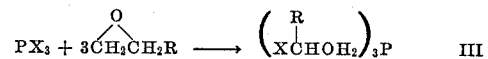

in which X and R have the significance indicated above.

In carrying out this reaction it is contemplated that any phosphorus trihalide may be employed, i.e., X can be chlorine, bromine, iodine or fluorine. However, it is preferred to employ those phosphorus trihalides in which the halogen is chlorine, bromine or a mixture thereof. Phosphorus trichloride and phosphorus tribromide are particularly preferred.

The alkylene oxide which is reacted with the phosphorus trihalide according to the process of the invention can be any alkylene oxide having a 1,2-epoxide ring. Illustrative are ethylene oxide, propylene oxide, butylene oxide, pentylene oxide, epichlorohydrin, trichlorobutylene oxide, hexylene oxide, octylene oxide, and the like. Usually these oxides contain from 2 to 8, and preferably from 2 to 4, carbon atoms. The most preferred alkylene oxide is ethylene oxide which when reacted with phosphorus trihalide according to the invention yields tris(2-haloethyl)phosphite.

Any suitable molar ratio of phosphorus trihalide to alkylene oxide may be employed. However, it is preferred to employ stoichiometric proportions of reactants, i.e. about 3 moles of alkylene oxide per each mole of phosphorus trihalide. This is in order to effect complete utilization or reaction of the phosphorus trihalide and avoid the formation of undesirable byproducts. Nevertheless, under proper conditions it may be desirable in some applications to employ a slight stoichiometric excess of alkylene oxide.

The reaction of the invention is carried out in the presence of a catalyst selected from the group consisting of a tertiary amine hydrohalide, a tetra-alkyl quaternary ammonium halide, and a mixture thereof. The use of a tertiary amine hydrohalide catalyst is preferred.

In accordance with the invention any tertiary amine hydrohalide may be employed to catalyze the reaction of phosphorus trihalide with alkylene oxide. In other words, the only critical features of such a catalyst is that it contains a tertiary nitrogen and a halogen. Thus the tertiary amine can be a heterocyclic tertiary amine hydrohalide, such as N-methyl morpholine hydrochloride, a heteroaromatic tertiary amine hydrohalide, such as pyridine hydrochloride; or a compound represented by Formula IV as follows

wherein each of $R_1$, $R_2$ and $R_3$ is independently a hydrocarbon radical and X is a halogen, preferably chlorine, bromine or iodine.

As indicated above, a wide variety of tertiary amine hydrohalides may be employed in practicing the invention. Thus the hydrocarbon radical represented by $R_1$, $R_2$ and $R_3$ in Formula IV can be for example any one of the following radicals:

an aliphatic radical,
a cycloaliphatic radical,
a monolefinic aliphatic radical,
a diolefinic aliphatic radical,
an aromatic radical, or
an aliphatic-aromatic radical.

Tertiary amine hydrohalides of Formula IV in which each of $R_1$, $R_2$ and $R_3$ is independently any such radical as enumerated above may be employed according to the invention. Thus none of the above radicals is limited with respect to the number of carbon atoms therein. However, the aliphatic, cycloaliphatic, monolefinic aliphatic, and diolefinic aliphatic radicals usually contain 1–12, and preferably 1–8, carbon atoms; the aromatic radical usually contains 6–14, and preferably 6–10, carbon atoms; and the aliphatic-aromatic radical usually contains 7–22, and preferably 7–14 carbon atoms.

Furthermore, each of the radicals attached to the tertiary nitrogen in the catalysts of the invention may be substituted, as well as unsubstituted, with any one or more of a variety of substituents. Illustrative substituents include for example halogen, nitro, alkoxy, carbalkoxy, carboxyl, carbonyl and so forth.

However, in the more preferred embodiments of the invention, those teritary aminehydrohalides are employed in which all the radicals attached to the tertiary nitrogen are unsubstituted, i.e., contain only carbon and hydrogen atoms. It is also particularly preferred to employ those tertiary amine hydrohalides in which the halogen is chlorine or bromine.

Illustrative of the aliphatic radicals represented by each of $R_1$, $R_2$ and $R_3$ in Formula IV, which radicals may be substituted or unsubstituted, are methyl, ethyl, propyl, isopropyl, butyl, pentyl, isopentyl, hexyl, heptyl, octyl, dodecyl, and the like.

Illustrative of the cycloaliphatic radicals represented by each $R_1$, $R_2$ and $R_3$ in Formula IV, which radicals may contain one or more substituents, are cyclopentyl, cyclohexyl, cyclooctyl, cyclododecyl and the like.

Illustrative of the monolefinic aliphatic radicals represented by each of $R_1$, $R_2$ and $R_3$ in Formula IV, which radicals may contain one or more substituents, are vinyl, propenyl, butenyl, pentenyl, ethynyl, propynyl, butynyl, petynyl, hexynyl and the like.

Illustrative of the diolefinic aliphatic radicals represented by each of $R_1$, $R_2$ and $R_3$ in Formula IV, which radicals may be substituted or unsubstituted, are 1,3-butadienyl, 1,2-butadienyl, 1,5-hexadienyl, 1,11-dodecadienyl and the like.

Illustrative of the aromatic radicals represented by each of $R_1$, $R_2$ and $R_3$ in Formula IV, which radicals may be substituted or unsubstituted, are phenyl, naphthyl, and anthryl, phenanthryl and the like.

Illustrative of the aliphatic-aromatic radicals represented by each of $R_1$, $R_2$ and $R_3$ in Formula IV, which radicals may be substituted or unsubstituted, are tolyl, xylyl, 1,2,3-trimethyl phenyl, 1,2-diethyl phenyl, 1,2,3-tripropyl phenyl, 9-methyl anthryl, isobutyl phenyl, t-butyl phenyl t-octyl phenyl, nonyl phenyl, and the like.

Illustrative tertiary amine hydrohalides employed according to the invention include the following:

the pyridine hydrohalides
the trimethyl amine hydrohalides
the triethyl amine hydrohalides
the 2, 3, and 4 picoline hydrohalides
the tributyl amine hydrohalides
the N-methyl morpholine hydrohalides
the trioctyl amine hydrohalides
the tridodecyl amine hydrohalides
the N,N-dimethyl aniline hydrohalides
the N,N-diethyl aniline hydrohalides
the quinoline hydrohalides
the isoquinoline hydrohalides
the quinuclidine hydrohalides
the N-alkyl-N-methyl aniline hydrohalides
the N-benzyl-N-ethyl aniline hydrohalides
the N-benzyl-N-ethyl-m-toluidine hydrohalides
the 3-chloro-N,N-diethyl aniline hydrohalides
the 2-chloro-N,N-diethyl-4-nitroaniline hydrohalides
the 3-chloro-N,N-dimethyl aniline hydrohalides
the N-(2-chloroethyl)-N-(2-methoxyethyl)-benzylamine hydrohalides
the N-(2-chloroethyl)-N-methylbenzylamine hydrohalides
the N-(3-chloropropyl)-N-methylbenzylamine hydrohalides
the N,N-dibenzyl aniline hydrohalides
the N,N-diethyl-p-anisidine hydrohalides
the N,N-diethylcyclohexylamine hydrohalides
the N-(2-chloroethyl)-diisopropylamine hydrohalides
the N,N-diisopropylethylamine hydroalides
the dimethylaminoacetaldehyde diethyl acetal hydrohalides
the dimethylamino-acetone hydrohalides
the p-dimethylaminobenzaldehyde hydrohalides
the 2, 3, and 4-dimethylaminobenzoic acid hydrohalides
the 4-dimethylbenzoin hydrohalides
the 4-(dimethylamino)-benzonitrile hydrohalides
the 4-dimethylaminocinnamaldehyde hydrohalides
the 2-dimethylaminocyclohexanone hydrohalides
the 4-dimethylamino-3,5-dinitrobenzoic acid hydrohalides
the 3-dimethylamino-1,2-diphenyl-2-propen-1-one hydrohydrohalides
the 2-dimethylaminoisopropyl chloride hydrohalides
the 4-dimethylamino-2-methylazobenzene hydrohalides
the N,N-dimethylaminoethyl ferrocene hydrohalides
the 3-(N,N-dimethylaminomethyl)-2-norbornanone hydrohalides
the 3-dimethylamino-1-phenyl-2-propen-1-one hydrohalides
the 1-dimethylamino-2-propyne hydrohalides
the N,N-dimethylbenzylamine hydrohalides
the N,N-dimethyl-2,4-dinitrostyrylamine hydrohalides
the N,N-dimethyl-3-nitroaniline hydrohalides
the N,N-dimethyl-4-nitrosoaniline hydrohalides
the N,N-dimethyl-1-phenylcyclohexylamine hydrohalides
the N,N-dimethyl-p-toluidine hydrohalides
the 2,2'-oxybis-(N,N-dimethylethylamine) hydrohalides
the N,N,N',N'-tetraethyl ethylene diamine hydrohalides
the tribenzylamine hydrohalides
the tripropargylamine hydrohalides
the tris-(2-chloroethyl)-amine
the N,N,N',N'-tetramethylbenzidine hydrohalides
the N,N,N',N'-tetramethyl-1,4-butanediamine hydrohalides
the N,N,N',N'-tetramethyl-2-butene-1,4-diamine hydrohalides
the N,N,N',N'-tetramethyl-2-butyne-1,4-diamine hydrohalides
the 3-acetoxypyridine hydrohalides
the 2-acetylpyridine hydrohalides
the 3-acetylpyridine hydrohalides the 4-acetylpyridine hydrohalides
the 2-benzoylpyridine hydrohalides
the 3-benzoylpyridine hydrohalides
the 4-benzoylpyridine hydrohalides
the 2-benzylpyridine hydrohalides
the 4-benzylpyridine hydrohalides
the benzyl 2-pyridyl ketone hydrohalides
the 1,2-bis-(2-pyridyl)-ethylene hydrohalides
the 1,2-bis-(4-pyridyl)-ethylene hydrohalides
the 2,3-bis-(2-pyridyl)-quinoxaline hydrohalides
the 2,5-bis-(4-pyridyl)-1,3,4-thiadiazole hydrohalides
the 2-bromopyridine hydrohalides
the 3-bromopyridine hydrohalides
the 4-bromopyridine hydrohalides
the 4-tertiary-butylpyridine hydrohalides
the 2-(p-chlorobenzoyl)-pyridine hydrohalides
the 4-(p-chlorobenzoyl)-pyridine hydrohalides
the 4-(p-chlorobenzyl)-pyridine hydrohalides
the 2-chloro-6-ethoxypyridine hydrohalides
the N-(2-chloroethyl)-piperidine hydrohalides
the 3-chloro-N-ethylpiperidine hydrohalides
the 2-chloro-6-methoxy-3-nitropyridine hydrohalides
the 4-chloro-N-methylpiperidine hydrohalides
the 2-chloro-3-nitropyridine hydrohalides
the 2-chloro-5-nitropyridine
the 2-chloro-4-picoline hydrohalides
the 6-chloro-2-picoline hydrohalides
the 2-chloropyridine hydrohalides
the 3-chloropyridine hydrohalides
the 4-chloropyridine hydrohalides
the 2,3,6-collidine hydrohalides
the collidine hydrohalides
the conyrine hydrohalides
the 2-cyano-6-methylpyridine hydrohalides
the 3-cyano-5-methylpyridine hydrohalides
the 4-cyano-4-phenylpiperidine hydrohalides
the 2-cyanopyridine hydrohalides
the 3-cyanopyridine hydrohalides
the 4-cyanopyridine hydrohalides
the 2,6-diacetylpyridine hydrohalides
the 2,5-dibromopyridine hydrohalides
the 3,5-dibromopyridine hydrohalides
the 2,3-dichloropyridine hydrohalides
the 3,5-dichloropyridine hydrohalides
the diethyl 2,6-dimethyl-3,5-pyridinedicarboxylate hydrohalides
the N,N-diethylnicotinamide hydrohalides
the N,N-diethylnipecotamide hydrohalides
the 2,6-dimethoxypyridine hydrohalides
the 2-dimethylamino-5-nitropyridine hydrohalides
the 2-dimethylaminopyridine hydrohalides
the 4-dimethylaminopyridine hydrohalides
the 6,7-dimethyl-2,3-di-(2-pyridyl)-quinoxaline hydrohalides
the N,N-dimethylnicotinamide hydrohalides
the 2,6-dimethylpiperidine hydrohalides
the 3-(2,4-dinitrophenoxy)pyridine hydrohalides
the diphenyl-2-pyridylmethane hydrohalides
the diphenyl-3-pyridylmethane hydrohalides
the diphenyl-4-pyridylmethane hydrohalides
the 2,2'-dipyridylamine hydrohalides
the di-2-pyridyl ketone hydrohalides
the 3-ethoxy-2-nitropyridine hydrohalides
the 2-ethoxypyridine hydrohalides
the ethyl isonicotinate hydrohalides
the ethyl isonipecotate hydrohalides
the 4-ethyl-3-methylpyridine hydrohalides
the 5-ethyl-2-methylpyridine hydrohalides
the ethyl 6-methyl-3-pyridyloxy acetate hydrohalides
the N-ethylnicotinamide hydrohalides
the ethyl nicotinate hydrohalides
the ethyl picolinate hydrohalides
the 2-ethylpyridine hydrohalides
the 3-ethylpyridine hydrohalides
the 4-ethylpyridine hydrohalides
the ethyl 2-pyridylacetate hydrohalides
the ethyl 3-pyridylacetate hydrohalides
the 2-fluoropyridine hydrohalides
the 3-iodopyridine hydrohalides
the 2,4-lutidine hydrohalides
the 2,6-lutidine hydrohalides
the 3,4-lutidine hydrohalides
the 3,5-lutidine hydrohalides
the 2-(β-methoxyethyl)-pyridine hydrohalides
the 2-methoxy-3-nitropyridine hydrohalides
the 2-methoxy-5-nitropyridine hydrohalides
the 2-methoxypyridine hydrohalides
the methyl isonicotinate hydrohalides
the N-methylnicotinamide hydrohalides
the methyl nicotinate hydrohalides
the N-methyl-4-phenyl-1,2,3,6-tetrahydropyridine hydrohalides
the N-methylpiperidine hydrohalides
the 1-methyl-4-piperidone hydrohalides
the 6-methyl-2-pyridinecarboxyaldehyde hydrohalides
the methyl 2-pyridylacetate hydrohalides
the 1-methyl-2-styrylpyridinium iodide hydrohalides
the 2-methyl-5-vinylpyridine hydrohalides
the 2-(morpholinomethyl)-pyridine hydrohalides
the 2-morpholino-5-nitropyridine hydrohalides
the nicotinamide hydrohalides
the nicotinic acid hydrohalides
the nipecotamide hydrohalides
the 4-(p-nitrobenzyl)-pyridine hydrohalides
the 3-pentyloxypyridine hydrohalides
the 4-(3-phenylpropyl)-pyridine hydrohalides
the 2-phenylpyridine hydrohalides
the 4-phenylpyridine hydrohalides
the picolinic acid hydrohalides
the 2-picolyl chloride hydrohalides
the 3-picolyl chloride hydrohalides
the 4-picolyl chloride hydrohalides
the 2-pyridinecarboxyaldehyde hydrohalides
the 3-pyridinecarboxyaldehyde hydrohalides
the 4-pyridinecarboxyaldehyde hydrohalides
the 2,3-pyridinedicarboxylic acid hydrohalides
the 2,4-pyridinedicarboxylic acid hydrohalides
the 2,5-pyridinedicarboxylic acid hydrohalides
the 2,6-pyridinedicarboxylic acid hydrohalides
the 3,4-pyridinedicarboxylic acid hydrohalides
the 3,5-pyridinedicarboxylic acid hydrohalides
the 2,3-pyridinedicarboxylic anhydride hydrohalides
the 2-pyridylacetic acid hydrohalides
the 3-pyridylacetic acid hydrohalides
the 4-pyridylacetic acid hydrohalides
the 3-pyridylacetonitrile hydrohalides
β-(3-pyridyl)-acrylic acid hydrohalides
the 2-stilbazole hydrohalides
the 2-vinylpyridine hydrohalides
the 4-vinylpyridine hydrohalides Particularly preferred tertiary amine hydrohalides for use according to the invention include the following:

pyridine hydrochloride and hydrobromide
trimethyl amine hydrochloride and hydrobromide
triethyl amine hydrochloride and hydrobromide
picoline hydrochloride and hydrobromide
N-methyl piperidine hydrochloride and hydrobromide
tributyl amine hydrochloride and hydrobromide
N-methyl piperidine hydrochloride and hydrobromide
N-methyl morpholine hydrochloride and hydrobromide
trioctyl amine hydrochloride and hydrobromide
tridodecyl amine hydrochloride and hdyrobromide
N,N-dimethyl aniline hydrochloride and hydrobromide
quinoline hydrochloride and hydrobromide
isoquinoline hydrochloride and hydrobromide
quinuclidine hydrochloride and hydrobromide.

It is within the contemplation of the invention to use the tertiary amine hydrohalide catalyst as a preformed compound or to generate such a compound in-situ in the reaction medium. For example, in the case of pyridine hydrochloride this may be added as such or it may be generated in-situ by the addition of pyridine and ethylene chlorohydrin to the reaction medium.

As stated earlier, the reaction of phosphorus trihalide with an alkylene oxide is carried out, according to the invention, in the presence of a tertiary amine hydrohalide, a tetra-alkyl quaternary ammonium halide, or a mixture thereof. The tetra-alkyl quaternary ammonium halide can be any compound represented by Formula V as follows

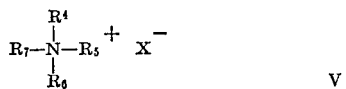

wherein each of $R_4$, $R_5$, $R_6$ and $R_7$ is independently a substituted or unsubstituted alkyl radical and X is a halogen, preferably chlorine, bromine or iodine.

Illustrative of the radicals represented by each of $R_4$, $R_5$, $R_6$ and $R_7$ in Formula V are methyl, ethyl, propyl, isopropyl, butyl, pentyl, hexyl, heptyl, octyl, dodecyl and the like, These radicals may be substituted with one or more substituents such as described earlier in connection with substituents on the radicals $R_1$, $R_2$ and $R_3$ of Formula IV.

Particularly preferred tetra-alkyl quaternary ammonium halides for use according to the invention are those in which the halogen is chlorine or bromine and all the alkyl radicals are unsubstituted radicals having 1–12 carbon atoms.

Illustrative of the tetra-alkyl quaternary ammonium halide catalysts of the invention are the following:

the tetramethyl ammonium halides
the tetrapropyl ammonium halides
the allyltriethyl ammonium halides
the allyltrimethyl ammonium halides
the N-benzyltrimethyl ammonium halides
the 2-bromoethyl-trimethyl ammonium halides
the dibenzyldimethyl ammonium halides
the 2,2-diethoxyethyltrimethyl ammonium halides
the tetraethyl ammonium halides
the tetrabutyl ammonium halides
the diethyldimethyl ammonium halides
the methyl triethyl ammonium halides.

Various other tetra-alkyl ammonium halides may be employed in the process of the invention including, for example, those disclosed in U.S. Pat. 3,377,382 which issued to L. F. Elmquist on Apr. 9, 1968.

The reaction of phosphorus trihalide with an alkylene oxide is carried out in the presence of any suitable proportion of the catalysts of the invention, i.e., any proportion which is effective in promoting the reaction. Usually, however, catalytic proportions are employed such as from about 0.01 to about 6%, and preferably from about 0.2% to about 2%, by weight based on the weight of the phosphorus trihalide reactant which is employed.

Although the reaction may be carried out in the absence of a solvent medium, it is generally preferred to employ a solvent inasmuch as this helps in dissolving the catalyst in the reaction system thus making for a more efficient utilization of the catalyst. Furthermore, the presence of a solvent aids in dissipating localized heat which is generated in the course of the reaction which, as noted earlier, is exothermic. Any inert organic liquid which is a solvent for both the catalyst and the phosphorus trihalide may be employed for this purpose, such as ethylene dichloride. It is also generally preferred to exclude moisture from the reaction medium such as by using a blanket of nitrogen gas.

Any convenient order of mixing the reactants and the catalyst may be employed. For example all of the reactants, the solvent, if such is used, and the catalysts may be added simultaneously to a reactor, and the reactor contents may then be agitated and caused to react at the desired temperature until the reaction has attained the desired degree of completion. This procedure is preferred when carrying out the reaction on a continuous basis; whereas in a batch reaction it is preferred to add the phosphorus trihalide, as such or dissolved in a solvent, and the catalyst to the reactor first. These are then mixed together, and finally the alkylene oxide, which may also be dissolved in solvent, is added incrementally over a period of time.

For the most efficient utilization of the catalysts of the invention, it is usually desirable that the catalyst dissolve in the reaction medium. However, in the case of the tertiary amine hydrohalide catalyst, complete dissolution at the commencement of the reaction is not necessary; for it has generally been found that as the reaction proceeds, the formation of the phosphite product promotes the complete dissolution of the catalyst in the reactive mixture.

After the reactants and catalyst are placed in the reactor, reaction proceeds usually spontaneously, although initial heating of the reactants may be used. During the course of the reaction, the reactive mixture may be maintained at any suitable temperature or temperature range at which the reaction can proceed to completion. Usually a reaction temperature of about −10 to about 150° C., and preferably about 0–130° C. is employed. Optimum reaction conditions obtain at a temperature ranging from about 40° C. to about 115° C. Conventional cooling can be suitably employed to maintain the reactive mixture at the desired temperature; or, according to the most preferred embodiment of the invention, the reaction is carried out under reflux condition thereby enabling adequate control of the temperature within the above specified range of about 40–115° C. In view of the highly effective catalytic activity of the catalyst of the invention, however, close control of the reaction temperature is usually not necessary. For example, so long as a temperature is maintained within the above-specified preferred ranges, the reaction will usually proceed fairly rapidly, i.e., with a minimum residence or induction time, and substantially without the formation of undesirable byproducts nor the occurrence of undesrable side effects.

Upon completion of the reaction, which normally takes anywhere from about 1 minute to about 12 hours, tris(2-haloalkyl)phosphite is recovered as the only or main product of the reaction. Where the reaction is conducted in a solvent medium, the product tris(2-haloalkyl)phosphite will be in the form of a solution thereof in the solvent, and this can be removed by conventional means such as evaporation. Furthermore, if the reaction product is desired in a highly purified form, it may be subjected to suitable purification operations. However, neither purification nor the removal of the solvent are necessary when the product phosphite is to be used in the preparation of tetrakis(2-haloalkyl) alkylene diphosphate flame retardants.

The product of the process of the invention is of particular utility in a two-step process for the preparation of flame retardant halogenated phosphate polyesters. Thus the tris(2-haloalkyl)phosphite, obtained according to the invention as such or in solution, can be reacted with a halogen gas to form bis(2-haloalkyl)phosphorohalidate, and this in turn can then be reacted with an alkylene glycol to yield tetrakis(2-haloalkyl)alkylene diphosphate. The latter compound is a highly effective flame retardant additive for use in polyurethane foam. A detailed description of the utility of tetrakis(2-haloalkyl)alkylene diphosphate in making flame retardant polyurethane foam is provided in co-pending U.S. application Ser. No. 8,040, filed on Feb. 2, 1970, now Pat. 3,707,586, the entire disclosure of which is incorporated by reference herein.

By utilizing the catalysts of the invention to catalyze the reaction of phosphorus trihalide with an alkylene oxide, a product tris(2-haloalkyl)phosphite is obtained which is substantially free of phosphonate byproduct impurities. Furthermore, the speed of the reaction is improved since a minimum or no induction time is required. Finally, the speed and outcome of the reaction is not materially affected by relatively small variations in temperature. From a practical standpoint, this allows a reasonable latitude of temperature variation during the course of the reaction and thus obviates the need for close monitoring and control of the reaction temperature.

The following examples are provided to illustrate the invention. In these examples, all parts and percentages are by weight unless otherwise specified.

EXAMPLE 1

In a reaction vessel equipped with a thermometer, 137.4 grams (1 mole) of phosphorus trichloride were dissolved in 275 grams of ethylene dichloride. One gram of pyridine hydrochloride catalyst was added to the solution. While maintaining the contents of the reaction vessel at a temperature of 5–14° C., a solution of 132 grams (3 moles) of ethylene oxide in 264 grams of ethylene dichloride was gradually added over a period of 5 hours. This addition was made through an inlet above the surface of the phosphorus trichloride solution. The reaction was complete after an additional 5 minutes, at which time a solution of the product tris(2-chloroethyl)phosphite dissolved in ethylene dichloride was removed from the reaction vessel. This solution was subjected to analysis by nuclear magnetic resonance (NMR). This analysis showed that a minimum of 99% of the phosphorus in the solution was in the form of the phosphite thus confirming the formation of tris(chloroethyl)phosphite. NMR analysis further showed no detectable phosphonate in the product.

COMPARATIVE TEST 1

The identical procedure of Example 1 was followed except that no pyridine hydrochloride was employed. An induction period was noted before the reaction started. NMR analysis showed that the product contained 5% phosphonate byproduct.

EXAMPLE 2

The identical procedure of Example 1 was repeated except that the contents of the reaction vessel were maintained at 38–42° C. instead of 5–14° C. The same results as in Example 1 were obtained, with no phosphonate detected in the reaction product.

EXAMPLE 3

The identical procedure of Example 1 was followed except that the reaction was carried out at a temperature of 20–30° C. and for a period of 8 hours. Again the same results of Example 1 were obtained, with no phosphonate detected in the reaction product.

EXAMPLE 4

The procedure of Example 1 was followed except that the ethylene oxide was used as is, rather than as a solution thereof; and the reaction was carried out under reflux conditions at a temperature of 102° C. The same results as in Example 1 were obtained with no phosphonate detected in the reaction product.

EXAMPLE 5

The identical procedure of Example 1 was followed except that here the pyridine hydrochloride was generated in situ. Thus instead of adding 1 gram of pyridine hydrochloride to the phosphorus trichloride solution, 2 grams of pyridine and 2 grams of ethylene chlorohydrin were used. Again the same results of Example 1 were observed including the absence of any detectable phosphonate byproducts.

EXAMPLE 6

The procedure of Example 5 was followed except that instead of pyridine hydrochloride, N,N-dimethyl aniline hydrochloride was used as the catalyst, and this was generated in-situ using 2 grams of N,N-dimethyl aniline and 2 grams of ethylene chlorohydrin. The same results of Example 5 were obtained with no detectable phosphonate byproduct.

EXAMPLE 7

In a reaction vessel equipped with a thermometer, there were placed a mixture of 1,374 grams of phosphorus trichloride, 2,750 grams of ethylene dichloride, and 10 grams of pyridine hydrochloride. Then a solution of 1,320 grams of ethylene oxide in 2,640 grams of ethylene dichloride was gradually added through an inlet in the reaction vessel which is below the surface of the phosphorus trichloride solution. The addition of ethylene oxide solution was carried out over a period of 10 hours and while maintaining the contents of the reaction vessel at 20–30° C. When the reaction was complete, a sample of the reaction product was analyzed for phosphonate by NMR analysis. No detectable phosphonate was found.

EXAMPLE 8

The general procedure of the preceding examples was followed using 275 grams of phosphorus trichloride, 2.0 grams of pyridine hydrochloride, 264 grams of ethylene oxide, and a reaction temperature range of 50–70° C. However, here no solvent was used. The product of the reaction was found by NMR analysis to contain no phosphonate by-product.

EXAMPLE 9

The identical procedure of Example 1 was followed except that the ethylene oxide was used as is instead of as a solution thereof in ethylene dichloride. Again no phosphonate in the reaction product was detected by NMR analysis.

EXAMPLES 10–11

The identical procedure of Example 1 was followed except that instead of 1 gram of pyridine hydrochloride, 0.50 gram was used in Example 10 and 0.25 gram was used in Example 11. In each case the product, analyzed by NMR, contained no detectable phosphonate.

EXAMPLES 12–13

The identical procedure of Example 1 was followed, except that instead of 1 gram of pyridine hydrochloride, 2 grams of triethyl amine hydrochloride were used in Example 12, and 2 grams of tetraethyl ammonium bromide were used in Example 13. In each case the reaction product was analyzed by NMR for its content of phosphonate, and in each case no phosphonate was detected.

COMPARATIVE TESTS 2–7

These tests are provided to show that when catalysts other than those of the invention are employed, phosphonate byproducts are formed. In each of these tests, the identical procedure of Example 10 was used except that instead of triethyl amine hydrochloride, dimethyl amine hydrochloride was used in Comparative Test 2, ferric chloride was used in Comparative Test 3, methyl amine hydrochloride was used in Comparative Test 4, 2-chloroethanol was used in Comparative Test 5, zinc bromide was used in Comparative Test 6, and ammonium chloride was used in Comparative Test 7. In each the reaction product was found, by NMR analysis, to contain some phosphonate byproducts as shown in Table 1 below.

TABLE 1

| Example or comparative test | Catalyst used | Percent phosphonate* |
|---|---|---|
| Example: | | |
| 1 | Pyridine hydrochloride | None |
| 6 | N,N-dimethyl aniline hydrochloride | None |
| 12 | Triethyl amine hydrochloride | None |
| 13 | Tetraethyl ammonium bromide | None |
| Comp. test: | | |
| 1 | None | 5 |
| 2 | Dimethyl amine hydrochloride | 3 |
| 3 | Ferric chloride | 5 |
| 4 | Methyl amine hydrochloride | 7 |
| 5 | 2-chloroethanol | 7 |
| 6 | Zinc bromide | 9 |
| 7 | Ammonium chloride | 8 |

*Percentage by weight based on the weight of the main phosphite product.

What is claimed is:

1. In a process for preparing a tris(2-haloalkyl)phosphite by catalytically reacting a phosphorus trihalide, in which the halogen is selected from chlorine, bromine and a mixture thereof, with an alkylene oxide having a 1,2-epoxide ring, the improvement which comprises carrying out the reaction in the presence of a catalyst selected from the group consisting of a tertiary amine hydrohalide, a tetra-alkyl quaternary ammonium halide, or a mixture thereof, said reaction being effected at a temperature ranging from about —10 to about 150° C.

2. The process of claim 1 wherein (1) said tertiary amine hydrohalide is one in which all radicals attached to the tertiary nitrogen contain only carbon and hydrogen and in which the hydrohalide group is a hydrochloride or hydrobromide, and (2) wherein said tetra-alkyl quaternary ammonium halide is one in which all the alkyl radicals are unsubstituted and contain 1–12 carbon atoms and in which the halogen is chlorine or bromine.

3. The process of claim 2 wherein said alkylene oxide contains 1–4 carbon atoms.

4. The process of claim 2 wherein said phosphorus trihalide is phosphorus trichloride or phosphorus tribromide.

5. The process of claim 2 wherein the reaction is carried out in the presence of an inert, organic liquid solvent medium.

6. The process of claim 2 wherein said tertiary amine hydrohalide catalyst is employed.

7. The process of claim 6 wherein said alkylene oxide contains 1–4 carbon atoms and said phosphorus trihalide is phosphorus trichloride or phosphorus tribromide.

8. The process of claim 7 wherein said tertiary amine hydrohalide is selected from the group consisting of pyridine hydrochloride, pyridine hydrobromide, trimethyl amine hydrochloride, trimethyl amine hydrobromide, triethyl amine hydrochloride, triethyl amine hydrobromide, a picoline hydrochloride, a picoline hydrobromide, N-methyl piperidine hydrochloride, N-methyl piperidine hydrobromide, tributyl amine hydrochloride, tributyl amine hydrobromide, N-methyl morpholine hydrochloride, N-methyl morpholine hydrobromide, trioctyl amine hydrochloride, trioctyl amine hydrobromide, tridodecyl amine hydrochloride, tridodecyl amine hydrobromide, N,N-dimethyl aniline hydrochloride, N,N-dimethyl aniline hydrobromide, quinoline hydrochloride, quinoline hydrobromide, isoquinoline hydrochloride, isoquinoline hydrobromide, quinuclidine hydrochloride and quinuclidine hydrobromide.

9. The process of claim 8 wherein the reaction is carried out at a temperature of from about 0 to about 130° C. and in the absence of moisture.

10. The process of claim 9 wherein said alkylene oxide is ethylene oxide and said phosphorus trihalide is phosphorus trichloride.

11. The process of claim 10 wherein said tertiary amine hydrohalide is selected from the group consisting of pyridine hydrochloride, triethyl amine hydrochloride, and N,N-dimethyl aniline hydrochloride.

12. The process of claim 11 wherein the reaction is carried out in the presence of an inert, organic liquid solvent medium.

13. The process of claim 12 wherein the reaction is carried out at a temperature of from about 40 to about 115° C. and under reflux conditions.

14. The process of claim 13 wherein about 3 moles of said alkylene oxide are employed per each mole of said phosphorus trihalide.

15. The process of claim 14 wherein said solvent is ethylene dichloride.

References Cited

UNITED STATES PATENTS 2,866,808   12/1958   Kolka _____ 260—977

LORRAINE A. WEINBERGER, Primary Examiner

R. L. RAYMOND, Assistant Examiner

U.S. Cl. X.R.

260—931, 967